April 12, 1932.  G. B. KENNEDY  1,853,622
ADVERTISING MEDIUM
Filed Aug. 1, 1930
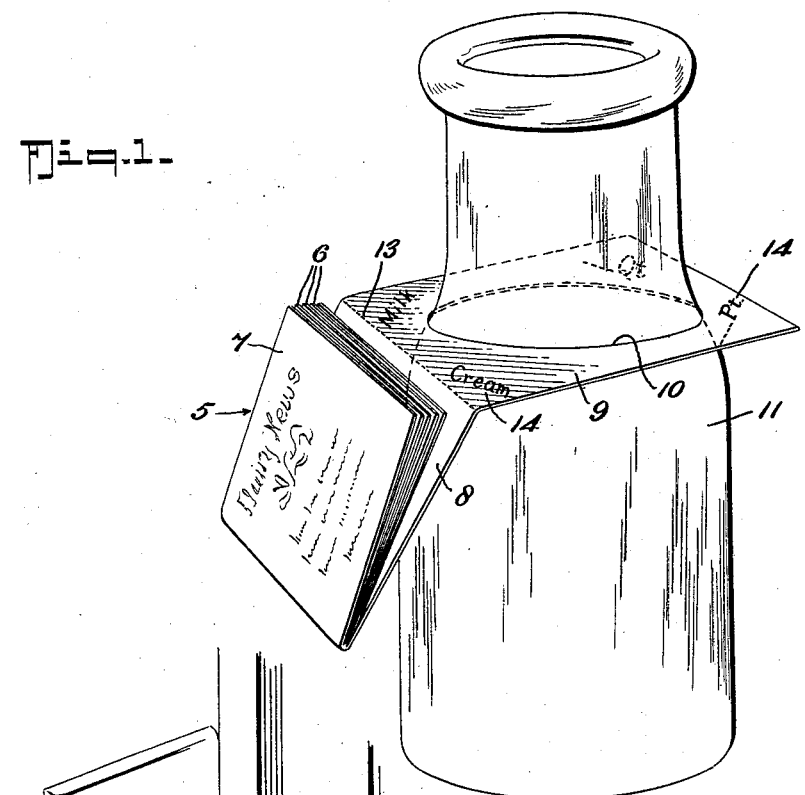
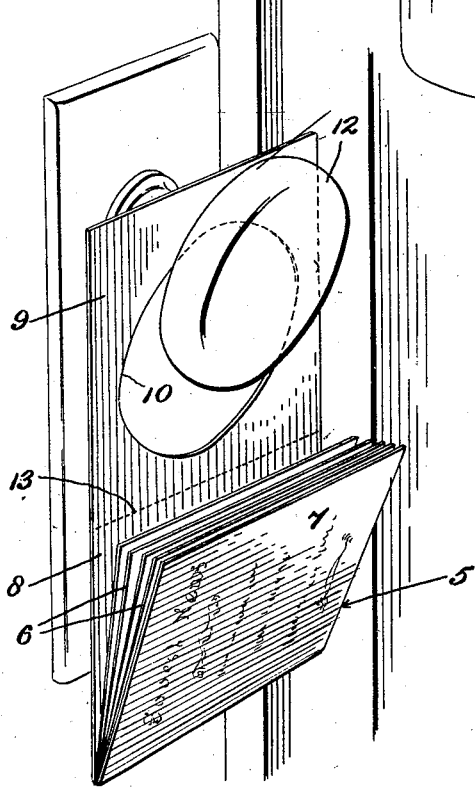
INVENTOR
George B. Kennedy,
BY *Herbert Collings*
ATTORNEYS Patented Apr. 12, 1932

1,853,622

UNITED STATES PATENT OFFICE

GEORGE B. KENNEDY, OF WASHINGTON, DISTRICT OF COLUMBIA

ADVERTISING MEDIUM

Application filed August 1, 1930. Serial No. 472,357.

This invention relates to advertising media and has for one of its objects to provide a device of this character which will be simple in construction, comparatively inexpensive to manufacture and more efficient in use than those which have been heretofore proposed.

A further object of the invention is to provide an advertising medium comprising a main message-carrying portion which in turn is provided with an extension having an aperture whereby the whole may be readily removably mounted on a support, the said extension being readily detachably secured to the main advertising carrying portion by a weakened line whereby it may be readily detached therefrom and either discarded or in some instances employed by the original recipient to convey a second message.

With the above and other objects in view which will appear as the description proceeds, the invention consists in the novel details of construction and combinations of elements more fully hereinafter disclosed and particularly pointed out in the appended claim.

Referring to the accompanying drawings forming a part of this specification in which like reference characters designate like parts in all the views:—

Figure 1 is a perspective view of the advertising medium constituting the present invention showing the same in place upon a milk bottle which may be one form of support employed; and Figure 2 is also a perspective view illustrating the advertising device hung upon a door knob which constitutes another form of support which may be employed.

In the said drawings, 5 indicates the main message or advertising carrying portion of the medium, here shown as comprising a booklet having a plurality of leaves 6, a front cover 7 and a rear cover 8. One of the cover members, herein shown as being the rear cover 8, is provided with an extension 9 having an aperture 10 by means of which the entire device may be readily removably positioned upon or secured to a support such for example, as the milk bottle 11 shown in Figure 1, or the door knob 12 shown in Figure 2.

The extension is preferably integral with the rear cover member 8 and is connected thereto by the weakened or scored line 13 whereby it may be readily severed or detached from the booklet 5 which is meant to be retained and read by recipient. The extension 9 may be discarded or in some instances it may be provided with suitable indicia 14 in order that it may be again employed to convey a message from the original recipient. In other words, as shown in Figure 1 the extension 9 may be provided with suitable characters whereby it may be employed to indicate to a dairyman the quantity and character of his products which are desired upon the next delivery. In this case the extension member 9 may be replaced upon the empty milk bottle when it is put in the place from which it is usually collected by the dairyman, and he will thus be informed as to the quantity of milk or cream which he is to leave upon the next delivery.

While the invention has been illustrated in Figure 1 for use in connection with dairy products it obviously is susceptible to wide use in advertising various other commodities, and as clearly shown in Figure 2 it may be distributed by hanging upon a door knob such as 12 when not employed in connection with the milk bottle 11.

It is obvious that those skilled in the art may vary the details of construction as well as the precise arrangement of parts without departing from the spirit of the invention, and it is not wished to be limited to the above disclosure except as may be required by the claim.

What is claimed is:

An advertising medium of the class described, comprising a message-carrying booklet, one of the covers of which has a readily detachable extension provided with an aperture whereby the whole may be readily removably positioned upon a support.

In testimony whereof I affix my signature.

GEORGE B. KENNEDY.